United States Patent [19]

Frankhouser

[11] Patent Number: 5,765,351
[45] Date of Patent: Jun. 16, 1998

[54] DETACHABLE GARDEN RAKE PICK-UP IMPLEMENT

[76] Inventor: Robert Frankhouser, 12701 Wagner Rd., Monroe, Wash. 98272

[21] Appl. No.: 765,000

[22] Filed: Dec. 16, 1996

[51] Int. Cl.⁶ ............................................. A01D 7/00
[52] U.S. Cl. ................................. 56/400.12; 56/400.04
[58] Field of Search ........................... 56/400.04, 400.07, 56/400.12

[56] References Cited

U.S. PATENT DOCUMENTS

| | | | |
|---|---|---|---|
| 828,646 | 8/1906 | Frederick | 56/400.12 |
| 1,160,282 | 11/1915 | Harris et al. | 56/400.12 |
| 1,715,613 | 6/1929 | McFadden | 56/400.12 |
| 2,136,849 | 11/1938 | Hembree | 56/400.12 |
| 2,504,943 | 4/1950 | Zifferer | 56/400.12 |
| 2,746,234 | 5/1956 | Utley | 56/400.12 |
| 2,891,374 | 6/1959 | Richmond | 56/400.12 |
| 2,942,401 | 6/1960 | Napoli | 56/400.12 |
| 3,105,348 | 10/1963 | Vosbikian et al. | 56/400.12 |
| 3,264,809 | 8/1966 | Jackson | 56/400.12 |
| 4,018,038 | 4/1977 | Sipe | 56/400.12 |
| 4,185,448 | 1/1980 | Blanco | 56/400.12 |
| 4,378,671 | 4/1983 | Gascon | 56/400.12 |
| 4,545,189 | 10/1985 | Nelson | 56/400.12 |

*Primary Examiner*—J. Woodrow Eldred
*Attorney, Agent, or Firm*—Harry M. Cross, Jr.

[57] ABSTRACT

A garden rake pick-up attachment for a garden rake of the type having a bow rake head tine section and a handle comprises a pick-up tine section, a clamp section, and a handle section; the pick-up tine section comprising a tine bar carried by yoke bars, the yoke bars having a yoke section therein including a hinge member extending between the yoke bars. The clamp section comprises top and bottom clamps shaped to engage the garden rake yoke bars and to confine the hinge member so that the pick-up tine section can pivot around the hinge member relative to the garden rake tine section. The pick-up yoke section is shaped to enable the garden rake handle to pass therethrough. The pick-up handle section comprises an elongated handle rod pivotably connected to the pick-up yoke section, a handle grip at an opposite end of the handle rod, and a stop for holding the pick-up tine section in an open position. The pick-up handle section is configured to provide a limit stop to prevent the pick-up tine section from being closed beyond a predetermined limit when installed on the garden rake.

6 Claims, 4 Drawing Sheets

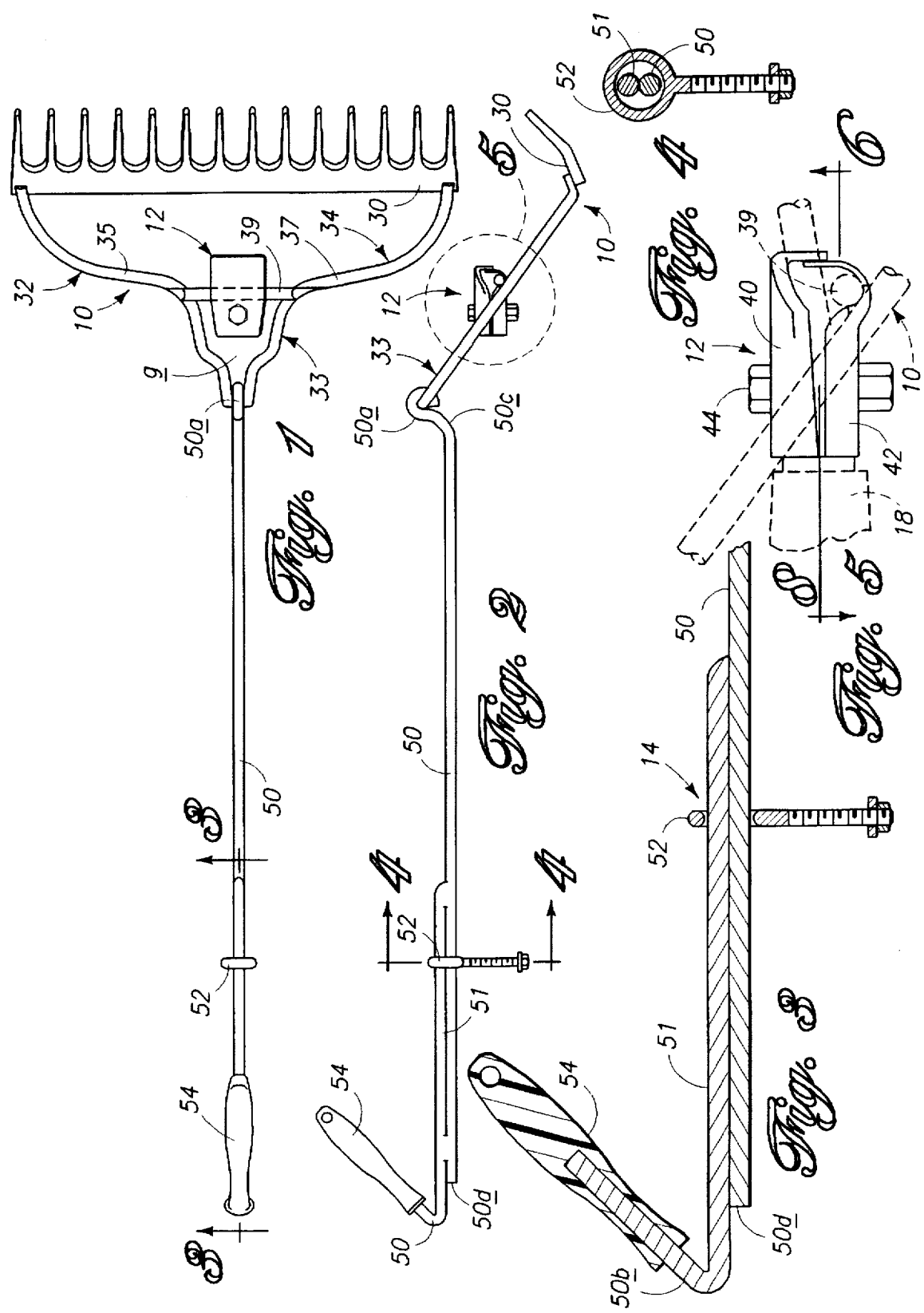

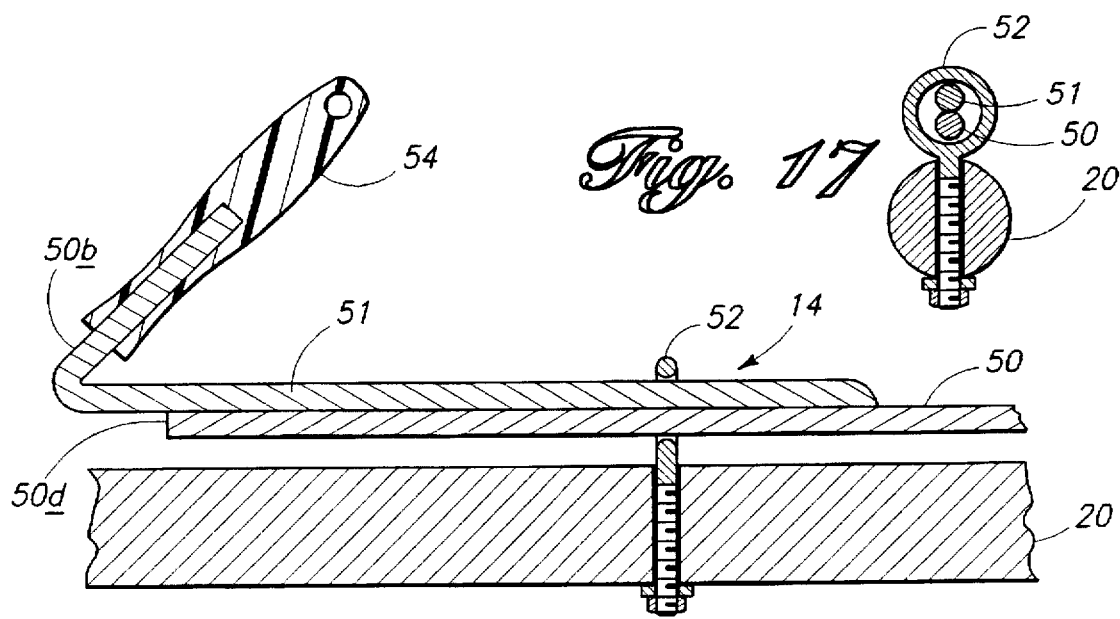
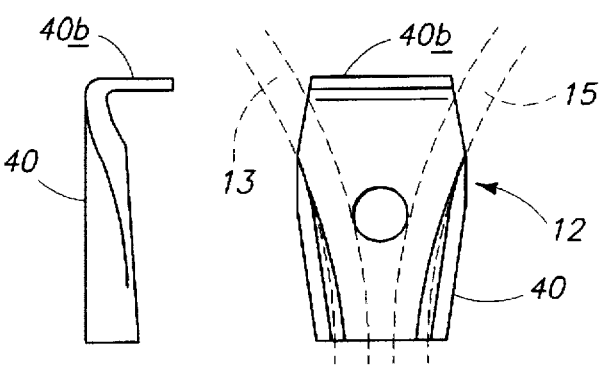
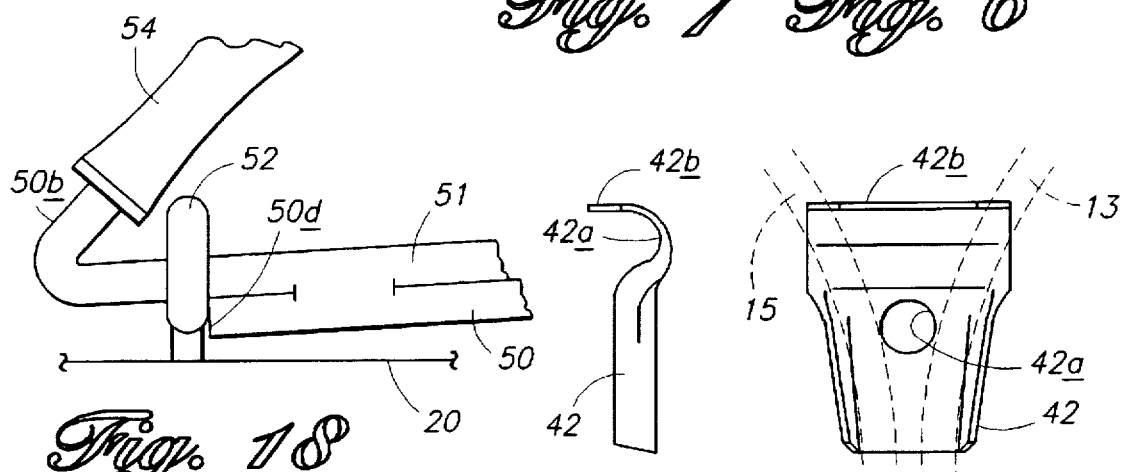

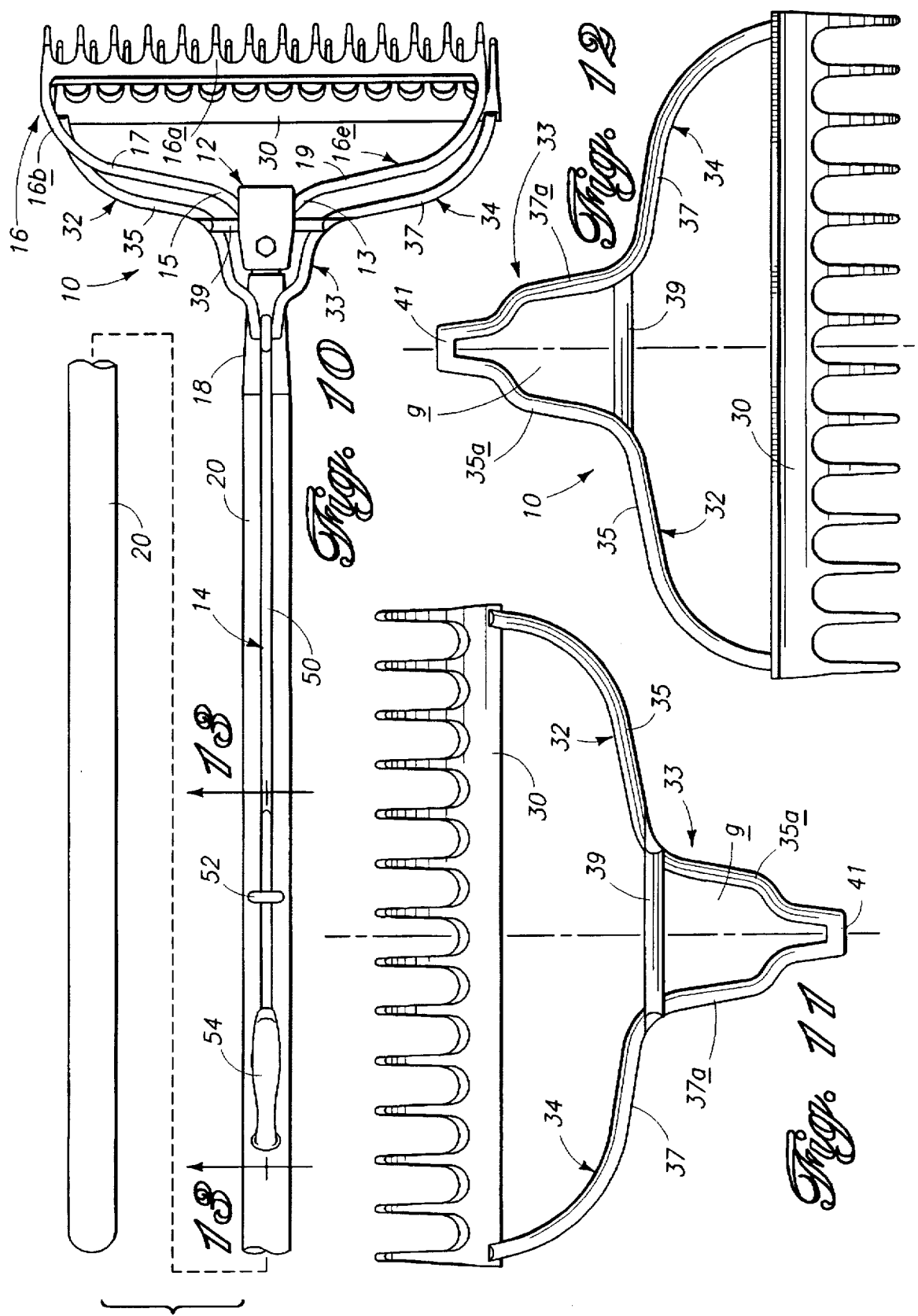

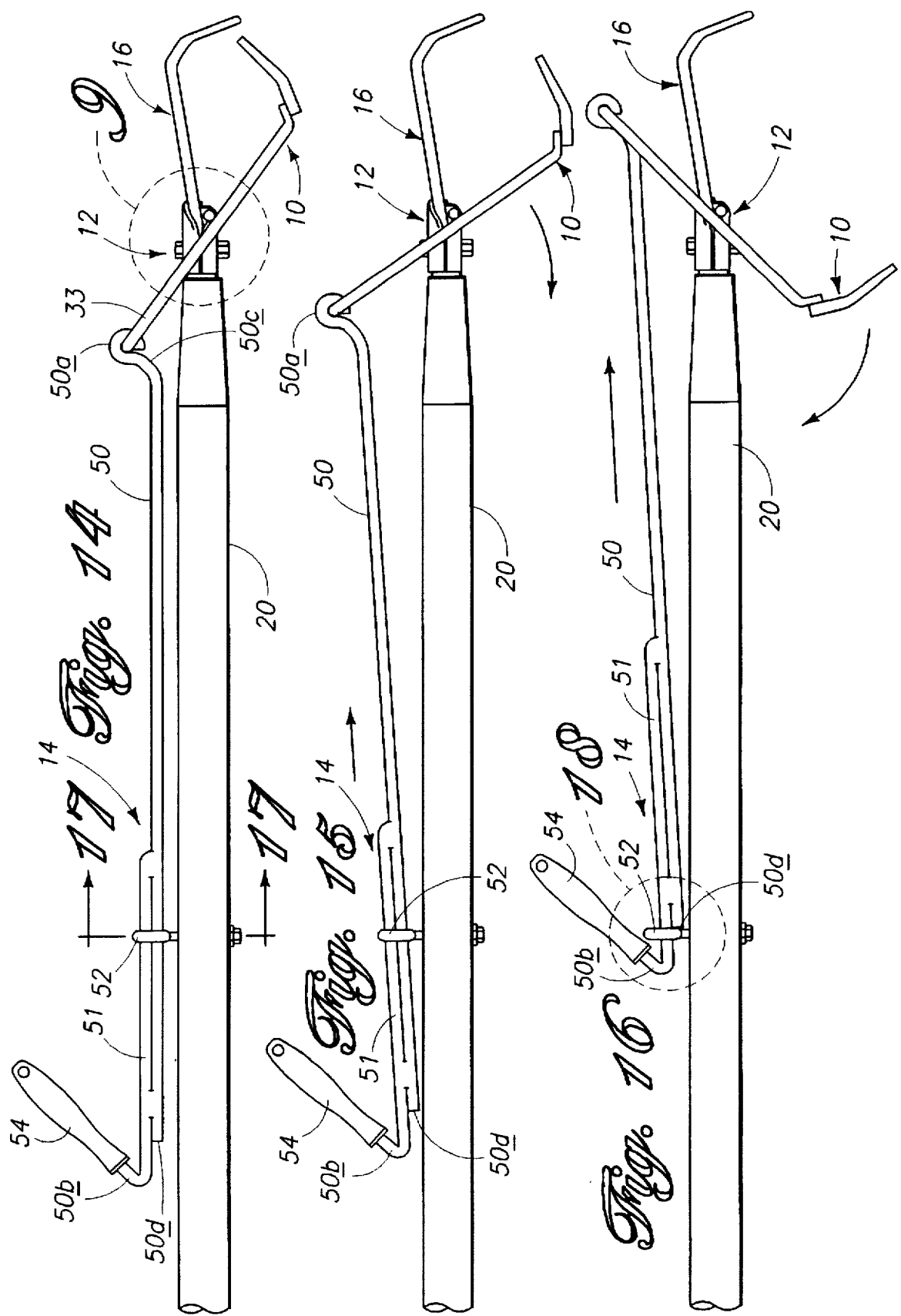

5,765,351

DETACHABLE GARDEN RAKE PICK-UP IMPLEMENT

BACKGROUND OF THE INVENTION

1. Field of the Invention

This invention relates to garden hand rakes and, more particularly, to implements for garden rakes designed to convert garden rakes so as to enable them to be used to pick up debris and other material.

2. Brief Description of the Prior Art

Garden hand rakes, of the type to which the present invention is applicable, are rakes typically having forged steel tines or teeth mounted between a pair of steel yoke rods. Such rakes are often called bow rakes, or soil rakes have bow rake heads. The steel yoke formed from the yoke rods is wedged into a steel socket that is joined to the end of an elongated wooden handle. Garden rakes of this type (i.e. soil rakes or bow rakes) are distinguished from flexibletine hand rakes typically known as lawn rakes or leaf rakes. Soil rakes are suited for use in braking-up and smoothing soil in gardens. Soil rakes, because of their short steel tines are not designed for regular lawn maintenance.

Although there have been proposals for adapting garden hand rakes by adding a pick-up attachment, the proposals have suffered from a number of deficiencies. Typically such attachments are permanent additions to garden rakes and usually require special configurations different from standard garden rake configurations. Moreover, such attachments are usually too expensive the manufacture. Consequently, commercial manufacturers of garden rakes are not interested in handling these modified rake configuration, thinking that the market for these modified rake configurations is too limited to be economical.

SUMMARY OF THE INVENTION

A primary object of the present invention is to provide a garden hand rake pick-up attachment that can be easily installed on a soil rake, having a bow rake head, by a homeowner or gardener. Another object is to provide such a pick-up attachment that is economical to manufacture so that it can be sold at a price that would be attractive to a homeowner or gardener. A further object is to provide such a pick-up attachment that can be easily installed and removed by a homeowner or gardener so that a bow head soil rake can be easily converted to a pick-up configuration and reconverted to its original configuration.

These objects and advantages will become apparent from the following description of the invention.

In accordance with these objects and advantages, the invention comprises a garden rake pick-up attachment for a garden rake of the type having a bow head tine section and a handle. The attachment comprises a pick-up tine section, a clamp section, and a handle section; the pick-up tine section comprising a tine bar carried by yoke bars, the yoke bars having a yoke section therein including a hinge member extending between the yoke bars. The clamp section comprises top and bottom clamps shaped to engage the garden rake yoke bars and to confine the hinge member so that the pick-up tine section can pivot around the hinge member relative to the garden rake bow head tine section. The pick-up yoke section is shaped to enable the garden rake handle to pass therethrough during installation of the attachment on the rake. The pick-up handle section comprises an elongated handle rod pivotably connected to the pick-up yoke section, a handle grip at an opposite end of the handle rod, and a stop for holding the pick-up tine section in an open position. The pick-up handle section is configured to provide a limit stop to prevent the pick-up tine section from being closed beyond a predetermined limit when installed on the garden rake. The pick-up handle section is also configured to provide a stop to prevent the pick-up tine section from being opening beyond a predetermined limit when installed on the garden rake.

BRIEF DESCRIPTION OF THE DRAWINGS

FIG. 1 is a top plan view of the pick-up attachment of the present invention;

FIG. 2 is a side elevation view of the FIG. 1 pick-up attachment;

FIG. 3 is an enlarged partial view in cross-section of the pick-up attachment actuating handle taken along line 3—3 of FIG. 1;

FIG. 4 is a cross-section view taken along the line 4—4 of FIG. 2;

FIG. 5 is an enlarged detail view taken from the region 5 of FIG. 2 showing the top and bottom clamps that attach the pick-up tine section to the rake in a hinged connection;

FIG. 6 is a bottom plan view of the top clamp taken from the plane 6 designated in FIG. 5;

FIG. 7 is a side view of the FIG. 6 top clamp;

FIG. 8 is a bottom plan view of the bottom clamp taken from the plane 8 designated in FIG. 5;

FIG. 9 is a side view of the FIG. 8 bottom clamp;

FIG. 10 is a top plan view of a garden hand rake with the pick-up attachment of the present invention installed on the rake;

FIG. 11 is a top plan view of the pick-up attachment tine section;

FIG. 12 is a bottom plan view of the pick-up attachment tine section;

FIG. 13 is an enlarged partial view in cross-section of the pick-up attachment actuating handle taken along the line 13—13 of FIG. 10;

FIG. 14 is a side elevation view of a garden hand rake with the pick-up attachment of the present invention installed on the rake, the pick-up tine section being shown in the closed position;

FIG. 15 is a side elevation view of a garden hand rake with the pick-up attachment of the present invention installed on the rake, the pick-up tine section being shown in a partially open position;

FIG. 16 is a side elevation view of a garden hand rake with the pick-up attachment of the present invention installed on the rake, the pick-up tine section being own in the open position;

FIG. 17 is a cross-section view through the garden rake handle taken along the line 17—17 of FIG. 14;

FIG. 18 is an enlarged partial view of the pick-up attachment actuating handle taken from the region 18 of FIG. 16 showing the handle locked in the open position.

DESCRIPTION OF THE PREFERRED EMBODIMENT

The garden rake pick-up attachment of this invention is designed to be detachably installed on a garden hand rake of the type known as a bow head soil rake. Garden hand rakes, of the type to which the present invention is applicable, are rakes typically having forged steel tines or teeth mounted between a pair of steel yoke rods. The curved appearance of the yoke rods gives the rake head a bow-shaped appearance, hence it being known as a bow head rake. The steel yoke formed from the yoke rods is wedged into a steel socket that is joined to the end of an elongated wooden handle. The pick-up attachment comprises a pick-up tine section 10, a clamp section 12, and a handle section 14. The garden rake of the type suitable for use with the present invention typically comprises a bow rake head steel tine section 16, a handle socket 18 and a wooden handle 20, the socket 18 mounting the tine section 16 and the wooden handle 20. Particularly as shown in FIG. 10, the garden rake tine section 16 comprises a forged steel tine bar 16a to each end of which a steel yoke rod, 16b, 16c, extends rearward in curved configurations to the handle socket 18. The yoke rod ends converge to and are inserted into the handle socket 18 wherein they are wedged therein so that tine section 16 is permanently and rigidly fixed to the handle 20. In the typical garden rake, the steel yoke rods converge toward one another along branch segments 17, 19 and are curved into a generally parallel configuration along tang segments 13, 15 that are inserted into the handle socket 18. These tang segments 13, 15 are shown in dashed lines in FIGS. 6 and 8 as they extend through the pick-up attachment top and bottom clamps of the clamp section 12.

The pick-up attachment tine section 10 comprises a forged steel tine bar 30, to each end of which a steel yoke rod, 32, 34, extends rearward in curved configurations to a yoke section 33. The yoke rods, 32, 34, converge toward one another along branch sections 35, 37 and terminate in the yoke section 33. Yoke section 33 is formed by extensions 35a, 37a of the branch sections 35, 37 which converge more gradually toward one another and are cross-connected by a hinge bar 39 that is fastened, as by welding, at the juncture of the branch sections 35, 37 with their extensions 35a, 37a as shown in FIGS. 11 and 12. Hinge bar 39 is mounted to the top side of the yoke rods so that it overlays them when the pick-up attachment is installed on the garden rake. The rearwardmost end of the yoke section 33 is closed by a cross rod section 41, rod section 41 and the extensions 35a, 37a being joined at right angles to one another.

The pick-up attachment tine bar 30 and the yoke rods 32, 34 may be the same as similar elements in commercially available garden hand rakes, that is as elements of bow rake heads. In the manufacture of the pick-up tine section 10, the yoke rods 32, 34 could be configured as shown in FIGS. 11 and 12, with the extensions 35a, 37a being the same as the tang sections 13, 15 of the rake yoke, only curved to provide the configuration of the yoke section 33 shown in FIGS. 11 and 12. After being formed in the configuration shown in FIGS. 11 and 12, a cross rod 41 could be welded to the ends of the extensions 35a, 37a. Consequently, the pick-up tine section 10 could be formed from the same elements as used in the fabrication of commercially available garden rake tine bars and yokes. The pick-up yoke 33 is configured so that it has a plan-view profile, as seen in FIGS. 11 and 12, that is bell-shaped, with the width of the yoke across its mid section being wide enough to pass the rake handle 20.

The pick-up attachment tine section 10 is attached to the garden rake by the clamp section 12. Clamp section 12 comprises a top clamp 40, a bottom clamp 42 and a clamping bolt and nut fastener 44. The bottom clamp 42 is formed to underlay and fit around the tang segments 13, 15 of rake tine section yoke rods and to hold the hinge bar 39. The top clamp 40 is formed to overlay and fit around the tang segments 13, 15 and to overlap the forward end of the bottom clamp 42. This arrangement is shown in FIGS. 5 and 6-9. The bolt of the bolt and nut fastener 44 extends through apertures provided therefore in the top and bottom clamps at 40a and 42a. The forward ends 40b, 42b of the top and bottom clamps are shaped to fit between the rake tang segments 13, 15 and to abut the tang segments as shown in FIGS. 6 and 8. When the top and bottom clamps are fitted to the rake tang segments as shown, the apertures 40a, 42b are so located that the fastener bolt can be inserted through the clamp parts without interference from the rake tang segments. The forward ends 40b, 42b of the top and bottom clamps therefore serve to conveniently locate the appropriate clamping position on the rake.

The pick-up attachment hinge bar 39 must be positioned on the tine section 10 so that its confinement within the bottom clamp 42 so positions the tine section 10 as to enable the pick-up attachment tine bar 30 to properly mesh with the rake tine bar 16a as shown in FIG. 10. Hinge bar 39 must span a distance across the yoke section 33 sufficient to enable it to ride in the bottom clamp 42 without the yoke section 33 binding against the clamp section 12. Bottom clamp 42 provides a transverse groove 42c for the hinge bar 39. Groove 42c is configured so as to enable hinge bar 39 to rotate therein so that the pick-up attachment tine bar 30 can be rotated into and out of engagement with the rake tine bar 16a about the longitudinal axis of the hinge bar 39.

The hinge bar 39 extends across the base of the bell-shaped yoke section 33 as shown in FIGS. 11 and 12. Therefore, when the tine section 10 is pivotably mounted to the clamp section 12, the yoke section 33 extends above the clamp section 12 as shown in FIGS. 14–16 during its full range of movement during operation of the invention. The upper end of the yoke section 33, defined by the cross bar 41 has a width sufficient to enable steel handle rod 50 to be fastened thereto. The attachment of handle rod 50 to cross bar 41 is provided by forming the end 50a of the handle rod around the cross bar so as to provide a ring clasp in a manner that permits relative rotative movement between cross bar 41 and the ring connector 50a. Because the extensions 35a, 37a of yoke section 33 are joined to cross rod 41 at right angles, the ring connector 50a of handle rod 50 will be prevented from tipping off cross rod 41 and becoming bound or locked onto one of the extensions 35a or 37a. Therefore, the configuration of the upper end of the yoke section 33 stabilizes the handle 50 and maintains handle rod alignment at all times.

The handle rod 50 extends rearwardly from it connection with cross rod 41 along the rake handle 20. At the upper end of the handle rod 50, a keeper 52 is provided to slidably contain the handle rod in longitudinal alignment with the rake handle 20. As shown in the drawings, keeper 52 is an eye bolt extended through the rake handle with its eye aligned with the handle rod 50. The eye of the keeper is large enough that the handle rod can move freely through it. The upper end of the handle rod 50 is provided with a handle grip 54 that is shaped and oriented so that a user of the rake can grip the rake handle 20 with one handle and the handle grip 54 with the other hand so the user can simultaneously pull on the grip 54 and lift the grip 54 to raise the rake tine section 16. As shown in the drawings, the upper end 50b of the handle rod 50 is angled outward and downward at about a 45° angle from the longitudinal axis of the rake handle 20 and handle grip 54 is secured over the handle rod end 50b.

When a user pulls on the handle grip 54, the pick-up attachment tine section 10 pivots around the hinge bar 39 in clamp section 12 and closes into closed juxtaposition with the rake tine section 16 as shown in FIG. 14. When the user pushes on the handle grip 54, the pick-up attachment tine section 10 pivots around the hinge bar 39 in clamp section 12 to open away from engagement with the rake tine section 16 as shown in FIG. 15. When the user pushes on handle grip 54 so as to push handle rod 50 to its fullest forward extend, the pick-up attachment tine section 10 pivots around the hinge bar 39 in clamp section 12 to the fully open position shown in FIG. 16.

The handle rod 50, at a point 50c just above the ring connector 50a, is formed to provide a rake handle bearing point to limit the extent to which the handle rod 50 can be pulled backward. When the handle rod 50 is pulled backward to the extent shown in FIG. 14, so that the pick-up attachment tine section 10 is fully engaged to the design limit shown, bearing point 50c will contact the rake handle 20 and prevent further rearward pivoting moving of the yoke section 33. This design limit configuration will prevent the yoke section 33 from becoming bound or locked in a position from which is cannot be easily dislodged. Furthermore, this design limit configuration will prevent the two tine sections, pick-up attachment tine section 10 and rake tine section 16, from becoming so enmeshed that they become bound or locked together. For typical uses of the pick-up attachment of this invention, it is not necessary for the two tine sections to be placed into positions where their respective tines, or teeth, are enmeshed. It is usually sufficient to provide for their close juxtaposition as shown in FIG. 14, a position where debris and other material trapped between the two tine sections will be held while the rake is picked up and moved.

The handle rod 50, at a point 50d just below the handle grip 54, is formed to provide a rake handle locking, or latching, point to hold the pick-up attachment in the fully open position shown in FIG. 16. Consequently, when the locking point 50d is engaged, the pick-up attachment tine section 10 is locked into its fully open position, as shown in FIG. 16, so that the rake can be moved around and even used in ordinary raking actions without interference from the pick-up attachment tine section. The locking point 50d can be conveniently provided by doubling the rod 50 to provide a parallel rod extension 51 that extends on top of the main rod 50 and through the eye of keeper 52. Rod section 51 conveniently mounts the handle grip 54. The upper end of the rod 50 defines the locus of point 50d such that the rod 50 drops down within the eye of keeper 52 when the rod 50 has cleared the eye, at the position shown in FIGS. 6 and 10. Rod section 51 serves the additional functions of providing stiffening for the rod 50, and also providing additional weight so that the handle rod will naturally drop into the open locking condition shown in FIGS. 16 and 18.

When the attachment is opened to its fullest extent, as shown in FIG. 16, the pick-up attachment tine section yoke rods 32, 34 will bear against the rake tine section yoke rods 17, 19, thereby preventing further opening of the attachment. The interaction serves to limit the extent to which the attachment can be opened.

The pick-up attachment shown in FIGS. 1 and 2 is assembled onto a soil rake by extending the rake handle 20 through gap "g" between the attachment yoke rod segments 35a, 37a adjacent to the cross-rod section 41 (see. FIGS. 11 and 12 as well). The attachment tine section 10 and the rake tine section 16 are juxtaposed opposite one another, as shown in FIGS. 10 and 14, with their teeth extending toward one another. The two tine sections are then clamped together to the configuration shown in FIGS. 10 and 14. Eye bolt 52 is then inserted into an appropriately bored hole through the rake handle 20 and fastened thereto.

While the preferred embodiment of the invention has been described herein, variations in the design may be made. The scope of the invention, therefore, is only to be limited by the claims appended hereto.

The embodiments of the invention in which an exclusive property is claimed are defined as follows:

I claim:

1. A garden rake pick-up attachment for a garden rake of the type having a bow rake head tine section comprising two yoke bars attached to a tine bar, and a handle which attachment comprises a pick-up tine section, a clamp section, and a handle section; the pick-up tine section comprising a tine bar carried by yoke bars, the yoke bars having a yoke section therein including a hinge member extending between the yoke bars; the clamp section comprising top and bottom clamps shaped to engage the garden rake yoke bars and to confine said hinge member so that said pick-up tine section can pivot around said hinge member relative to the garden rake tine section; the pick-up yoke section being shaped to enable the garden rake handle to pass therethrough; the pick-up handle section comprising an elongated handle rod pivotably connected to said pick-up yoke section, a handle grip at an opposite end of said handle rod, and a stop for holding said pick-up tine section in an open position; said pick-up handle section being configured to provide a limit stop to prevent said pick-up tine section from being closed beyond a predetermined limit when installed on the garden rake.

2. The pick-up attachment of claim 1 wherein said hinge member comprises a hinge rod connected across the top of said pick-up yoke section and wherein said bottom clamp is configured to carry said hinge rod so that said pick-up tine section is carried by the rake tine section when installed on the garden rake.

3. The pick-up attachment of claim 2 wherein the pick-up attachment handle rod is configured to provide said limit stop just above the connection of said handle rod with said pick-up yoke section when installed on the garden rake.

4. The pick-up attachment of claim 3 including a keeper engaged with said handle rod to align said handle rod with the garden rake handle when installed on the garden rake.

5. The pick-up attachment of claim 4 wherein said pick-up attachment handle section includes an extension rod mounted to the top of said handle rod and extending beyond said handle rod such that the upper end of said handle rod provides the stop for holding said pick-up tine section in an open position when said stop is engaged with said keeper; and wherein said handle grip is secured to said extension rod.

6. A garden rake pick-up attachment for a garden rake of the type having a bow rake head tine section comprising two yoke bars attached to a tine bar, and a handle which attachment comprises a pick-up tine section means, clamp section means, and handle section means; the pick-up tine section means comprising a tine bar carried by yoke bars, the yoke bars having a yoke section therein including a hinge means extending between the yoke bars; the clamp section means comprising top and bottom clamps shaped to engage the garden rake yoke bars and to confine said hinge means so that said pick-up tine section means can pivot around said hinge means relative to the garden rake tine section; the pick-up yoke section being shaped to enable the garden rake handle to pass therethrough; the pick-up handle section means comprising an elongated handle rod pivotably connected to said pick-up yoke section, a handle grip at an opposite end of said handle rod, and stop means for holding said pick-up tine section in an open position; and limit stop means to provide a limit stop to prevent said pick-up tine section means from being closed beyond a predetermined limit when installed on the garden rake.

\* \* \* \* \*